United States Patent
Weaver

(10) Patent No.: US 6,688,701 B1
(45) Date of Patent: Feb. 10, 2004

(54) SEATBELT ROUTING AND RESTRAINT SYSTEM

(76) Inventor: Mary A. Weaver, 2915 S. Xanthia Ct., Denver, CO (US) 80231

( * ) Notice: Subject to any disclaimer, the term of this patent is extended or adjusted under 35 U.S.C. 154(b) by 0 days.

(21) Appl. No.: 09/902,136

(22) Filed: Jul. 9, 2001

(51) Int. Cl.$^7$ .......................... A62B 35/00; B60R 22/00; B60R 21/00
(52) U.S. Cl. .................. 297/485; 297/484; 297/482
(58) Field of Search ................... 297/485, 484, 297/482

(56) References Cited

U.S. PATENT DOCUMENTS

| | | | | |
|---|---|---|---|---|
| 1,048,033 A | * | 12/1912 | Brown | 297/485 |
| 3,099,486 A | * | 7/1963 | Scott | 297/485 |
| 4,205,670 A | * | 6/1980 | Owens | 297/485 X |
| 4,702,523 A | * | 10/1987 | Schrader et al. | 297/485 |
| 4,709,966 A | * | 12/1987 | Parkinson et al. | 297/484 X |
| 4,741,574 A | * | 5/1988 | Weightman et al. | 297/482 |
| 4,887,318 A | * | 12/1989 | Weinreb | 297/482 X |
| 4,927,211 A | * | 5/1990 | Bolcerek | 297/484 X |
| 4,944,530 A | * | 7/1990 | Spurrier | 297/482 X |
| 5,056,869 A | * | 10/1991 | Morrison | 297/485 |
| 5,135,257 A | * | 8/1992 | Short | 297/482 X |
| 5,215,333 A | * | 6/1993 | Knight | 297/482 X |
| 5,215,354 A | * | 6/1993 | Grene | 297/485 |
| 5,322,349 A | * | 6/1994 | Gianino | 297/482 |
| 5,443,037 A | * | 8/1995 | Saleme | 297/485 X |
| 5,547,250 A | * | 8/1996 | Childers | 297/485 X |
| 5,570,933 A | * | 11/1996 | Rouhana et al. | 297/482 X |
| 5,628,548 A | * | 5/1997 | Lacoste | 297/485 X |
| 6,053,580 A | * | 4/2000 | White, Sr. | 297/485 X |
| 6,076,527 A | * | 6/2000 | Rottinghaus et al. | 297/485 X |
| 6,203,110 B1 | * | 3/2001 | Proteau et al. | 297/482 X |

* cited by examiner

Primary Examiner—Rodney B. White
(74) Attorney, Agent, or Firm—Ramon L. Pizarro; Edwin H. Crabtree

(57) ABSTRACT

A restraint system for use on a vehicle's seat to better restrain by providing belts and belt guiding components to restrain a person in the event of an accident. The system uses a flexible, generally rectangular sheet having an upper surface, a lower surface, the rectangular sheet further having an upper edge, a lower edge and a mid-section between the upper edge and the lower edge, the lower edge of the rectangular sheet being adapted for attachment to the upper edge of the rectangular sheet. A set of shoulder-belts extending from the rectangular sheet at a location between the mid-section of the rectangular sheet and the upper edge of the rectangular sheet, the shoulder-belts are adapted for attaching to the lap-belt, so that they will extend from the rectangular sheet to the lap-belt, and so that the person is held against the rectangular sheet by the shoulder-belts and the lap-belt.

9 Claims, 5 Drawing Sheets

SEATBELT ROUTING AND RESTRAINT SYSTEM

BACKGROUND OF THE INVENTION (a) Field of the Invention

This invention generally relates to a restraint system use on automobile seats for adapting the routing of existing seatbelts to accommodate and restrain a child in the seat of a vehicle in the event of an accident. More particularly, but not by way of limitation, to a flexible device that includes belts for restraining a child in a vehicle seat and for routing the existing seat belts found in the vehicle to accommodate for the size of the child's body.

(b) Discussion of Known Art

Most of today's vehicles include seat belts that have been designed, or sized, for adult passengers. This means that the seatbelts are anchored at locations on the vehicle that correctly position the belts over an average American adult wearer's body, but result in a dangerous arrangement across the body of a smaller person, such as a child. Additionally, many vehicles are sold without seatbelts on certain seats. Examples of these vehicles are certain passenger vans, many school buses, and other vehicles that include bench or similar type seats.

Child car-seats have been widely accepted as a solution for use in vehicles with seatbelts that have been sized for adult passengers. These seats typically consist of a rigid or semirigid frame that includes belts that are anchored to the frame. The frame of these seats attaches to the seatbelts of the vehicle. The vehicle's seatbelt hold the seat frame against the surface of the vehicle's seats.

A significant problem associated with rigid-framed vehicle child restraint seats is that the rigidity of the frame does not accommodate the child's growth. Thus, a new car seat must be purchased every time that the child outgrows the seat.

Therefore, a review of known devices reveals that there remains a need for a child restraint device that can accommodate a wide range of statures.

Still further, there remains a need for child restraint system that can be mounted over a variety of seat styles, including bench seats and high-back bucket seats.

There remains a need for a child restraint system that can be used to support several children at once. Additionally, there remains a need for a child restraint system that can accommodate several children at once over a bench seat, as found many school buses used throughout the United States. Thus, there remains a need for a system that can be used to modify bench seats, that include a flat seat portion and a flat back portion, as found in many American school buses manufactured by the Blue Bird Company of Fort Valley, Ga.

Still further, it will be understood that there remains a need for a child support seat that is flexible, and can be easily collapsed to allow stowage of the device when not in use.

There remains a need for a soft, flexible car seat that can accommodate a variety of child statures and a variety of seat geometries, including bench seats, bucket seats, and high-back bucket seats.

SUMMARY

It has been discovered that the problems left unanswered by known art can be solved by providing a system that reroutes the seatbelts, where seatbelts exist, and cooperates with a lap-belt to restrain a person or child on the vehicle's seat. An important example of the invention includes:

A flexible, generally rectangular sheet having an upper surface, a lower surface, the rectangular sheet further having an upper edge, a lower edge and a mid-section between the upper edge and the lower edge, the lower edge of the rectangular sheet being adapted for attachment to the upper edge of the rectangular sheet;

A set of shoulder-belts extending from the rectangular sheet at a location between the mid-section of the rectangular sheet and the upper edge of the rectangular sheet, the shoulder-belts are adapted for attaching to the lap-belt, so that they will extend from the rectangular sheet to the lap-belt, and so that the person is held against the rectangular sheet by the shoulder-belts and the lap-belt. The rectangular sheet is held against the seat-back by winding the rectangular section under the seat-back so that the lower edge connects with the section of the rectangular sheet between the mid-section of the rectangular sheet and the upper edge of the rectangular sheet.

In vehicles having lap-belts, it is contemplated that the lap belts will extend over the rectangular sheet and over the passenger's waist or lap in a well known manner. The shoulder-belts will then attach to the lap-belts, so that the user is held or restrained by the lap-belts and the shoulder-belts of the disclosed invention.

In vehicles that do not have seat belts, it is contemplated that a lap-belt will be incorporated into the mid-section of the rectangular sheet. The shoulder-belts would then cooperate with this lap-belt as described above, to restrain the user in the seat.

Additionally, it is contemplated that crotch-belt or leg harness arrangement may also be incorporated into the system. The crotch-belt would be connected to the mid-section of the rectangular sheet and cooperate with the lap-belt to further restrain the person.

In another example of the invention, a set of belt adjustments are found between the mid-section and the upper edge of the rectangular sheet. The adjustments serving for varying the location from where the shoulder-belts extend from the rectangular sheet. In other words, these belt adjustments are used to vary the location on the upper surface of the rectangular sheet where the shoulder-belts interact with the rectangular sheet. In one example, these belt adjustments include loops that accept the shoulder-belts. The loops are placed at intervals along the rectangular sheet, so the free length of each of the shoulder-belts, between the location or end where the shoulder-belts connect with the lap-belt and the location where the belts are restrained by the adjustments, can be varied to accommodate different users. In other words, the point where the shoulder-belts are connected to the rectangular sheet is adjusted through the connection with these loops.

In applications where the vehicle is equipped with a seatbelt that includes a chest-strap, which extends diagonally across the wearer's torso, and a lap-belt, it is contemplated that the loops will be used to engage the chest-strap and re-direct the chest-strap to position the chest-strap over the trapezeus area, that the chest-strap will extend across the wearer's torso.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

Figure 4:
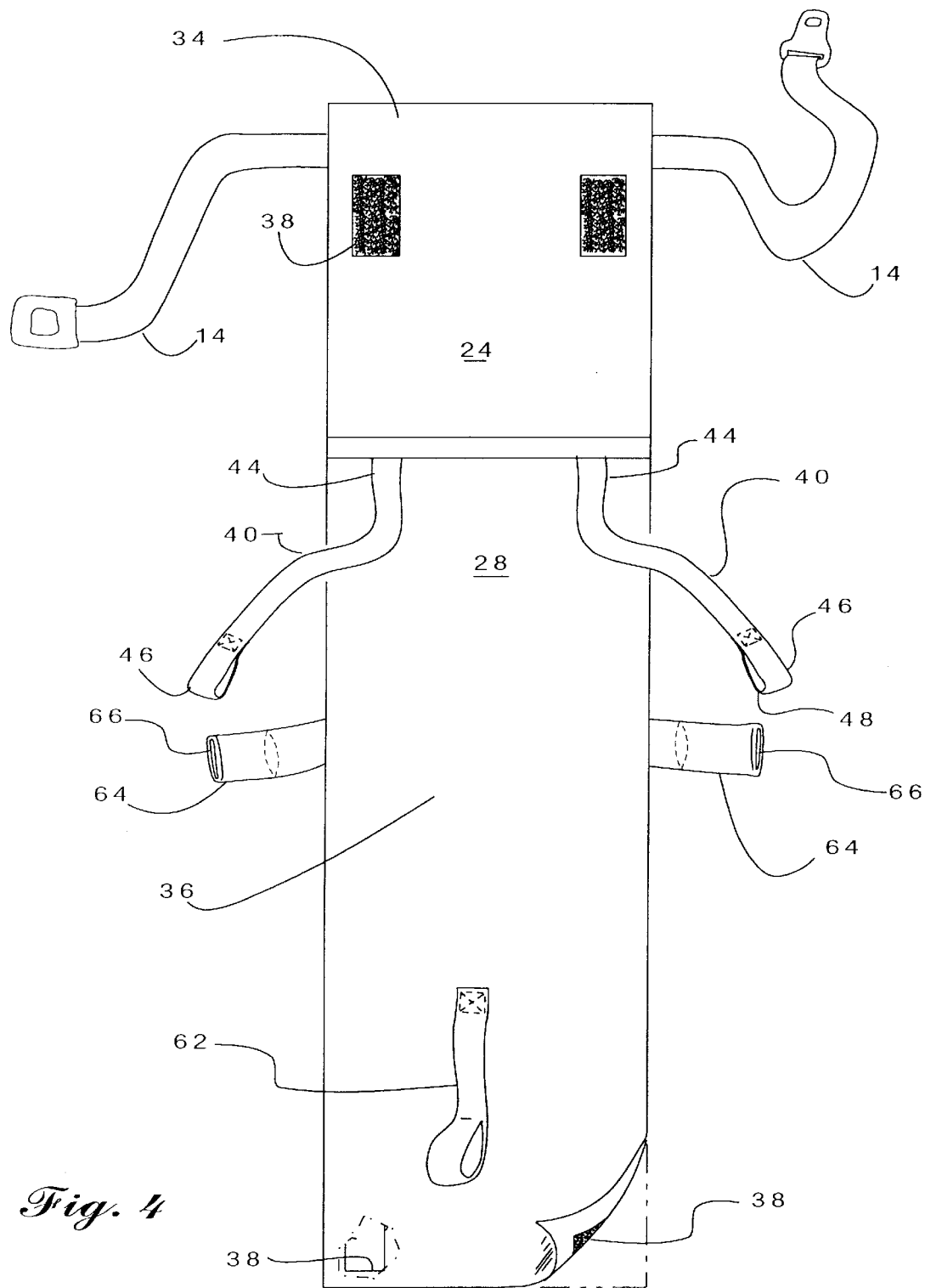
FIG. 4 is a plan view of an example of the invention. The illustration shows the example while laid over a flat surface prior to placing the device over a seat.
Figure 5:
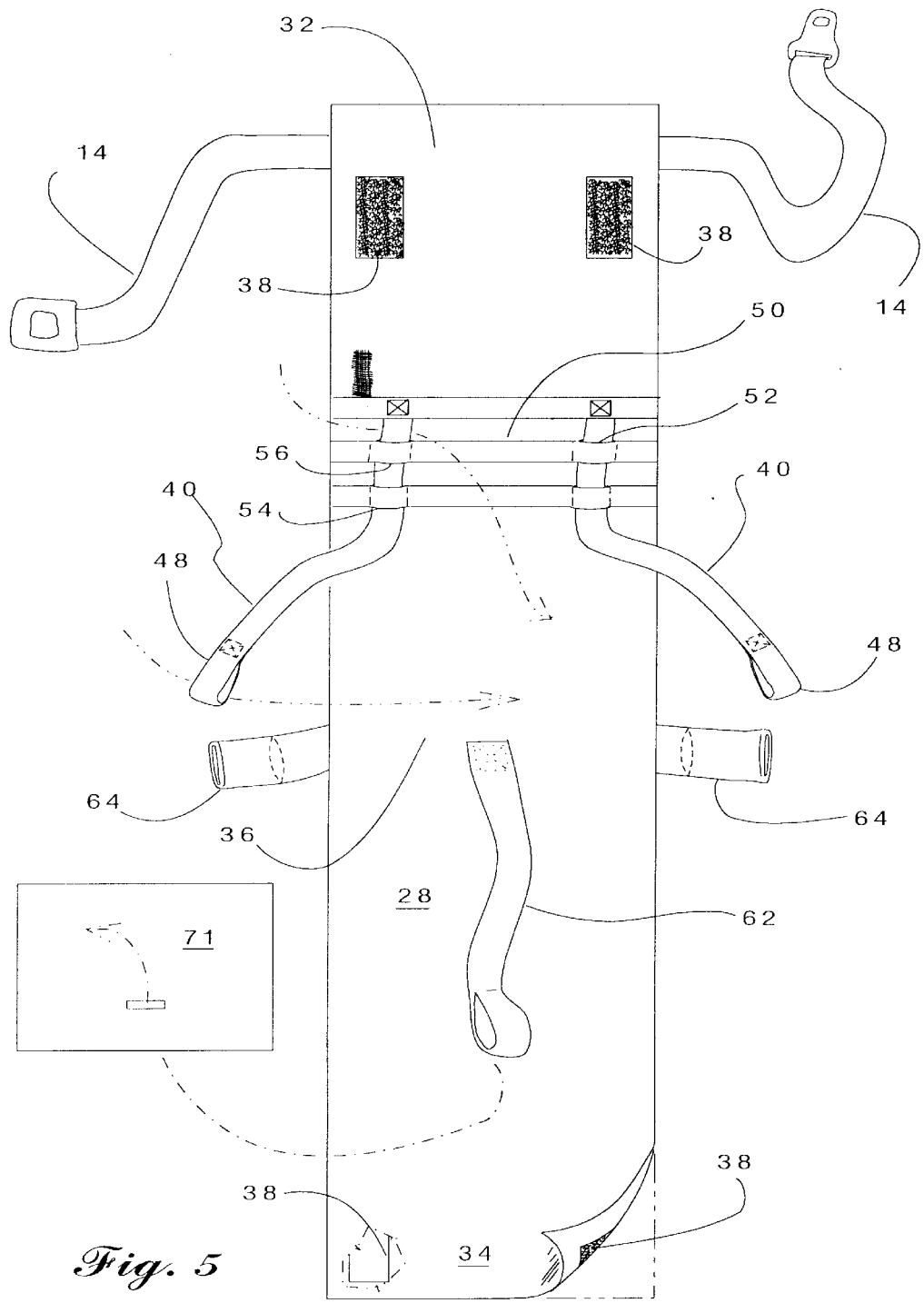

FIG. 5 illustrated the example shown in FIG. 4, and incorporates the use of belt adjustments with the invention.

Figure 6:
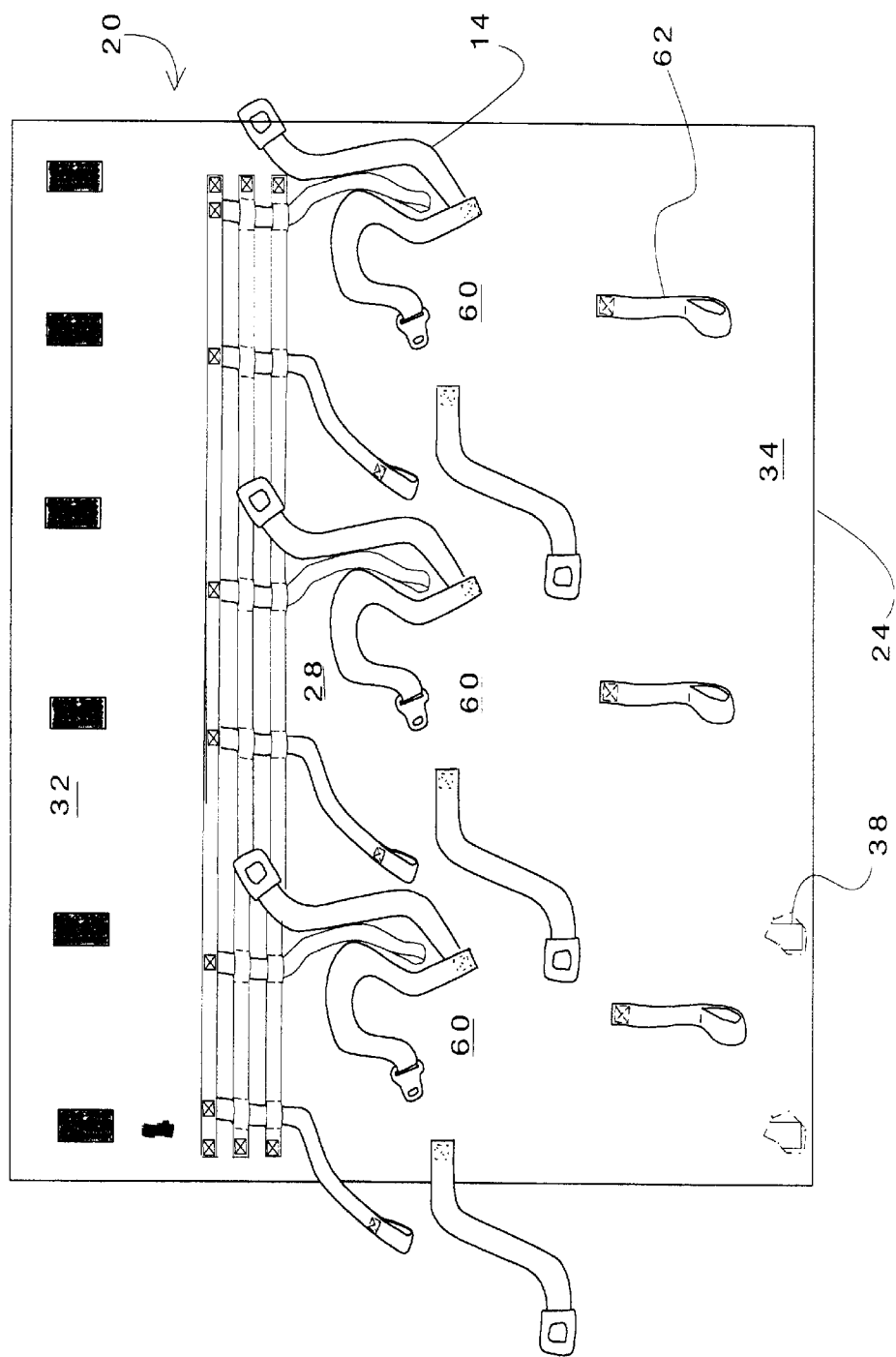

FIG. 6 is an example of the invention as used to provide seatbelts for three passengers on a bench type seat.

Figure 7:
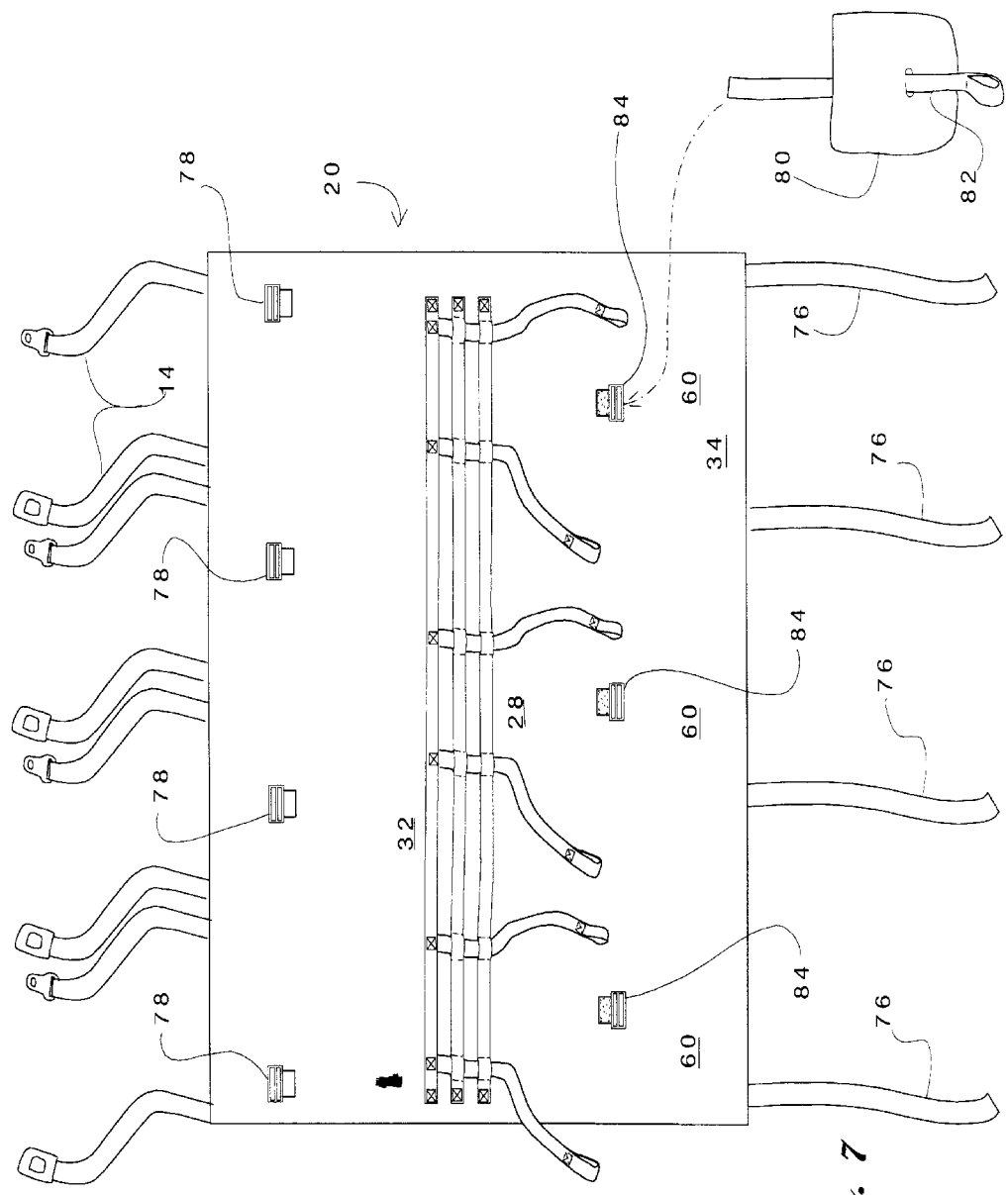

FIG. 7 further illustrates principles taught herein with a device for use by several passengers.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
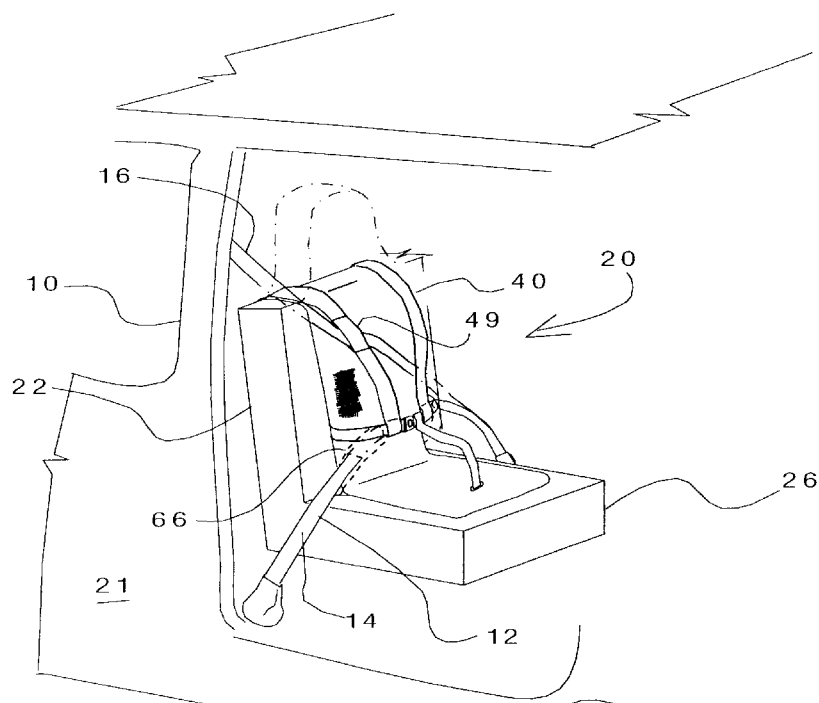
FIG. 1 is a perspective view of an example of the invention as used with a bench seat in a vehicle that includes seatbelts with a shoulder strap. The location of a possible headrest has been illustrated in phantom lines.
Figure 2:
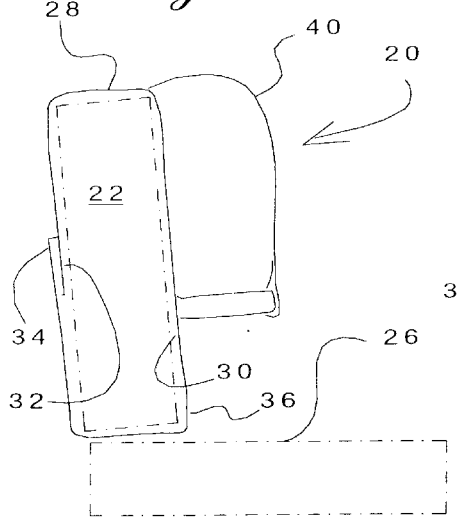
FIG. 2 is a side view of an example of the invention used with a bench seat that was not accompanied by Original Equipment Manufacturer (OEM) seat belts.
Figure 3:
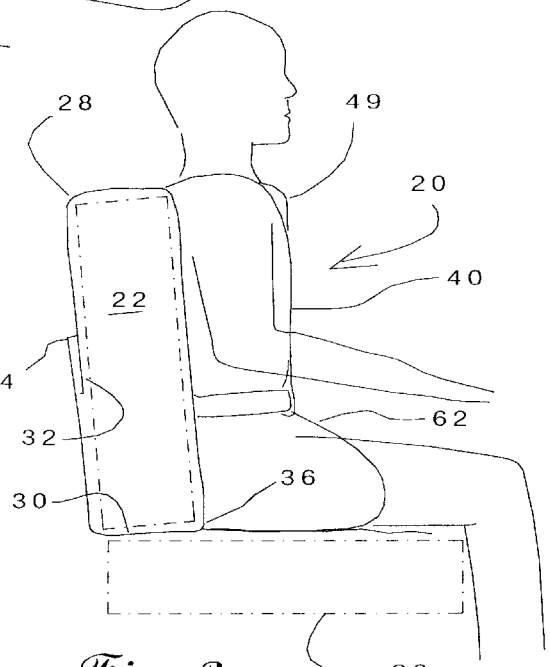
FIG. 3 is a side view of the embodiment illustrated in FIG. 2 with the addition of a crotch-strap.

Turning now to FIG. 1 where an example of the disclosed invention is illustrated while in use within a vehicle 10. The Vehicle 10 has been shown to include a seatbelt 12 with a lap-belt 14 and a chest-strap 16. In order to accommodate and restrain individuals of different statures, an example of a flexible support system 20 disclosed herein has been illustrated. However, the system 20 may be adapted for use on seats that do not include OEM seatbelts, as may be found in many school buses. The system 20 illustrated in FIG. 1 cooperates with the lap-belt 14 attached to a vehicle body 21, which may have been OEM belts found in most new vehicles.

OEM belts are typically sized to properly restrain an average adult in the event of an accident. These arrangements can be dangerous when used on people of different physical stature that the adult that was used as a basis for the design of the OEM belts. Therefore, the system 20 will allow the OEM belts to be re-routed to better accommodate children or others who are not of the same proportions as the average adult.

In an important example of the invention, the system 20 cooperates with a seat-back 22, which are found in most vehicles designed to transport people. As illustrated in FIGS. 1 and 4, the system 20 includes a flexible, generally rectangular sheet 24 that is wrapped around the seat-back 22 and anchor the system to the seat 26. The rectangular sheet 24 includes an upper surface 28, a lower surface 30, an upper edge 32, a lower edge 34 and a mid-section 36 between the upper edge 32 and the lower edge 34.

Referring to FIGS. 1 through 4, it will be understood that in order to anchor the system 20 to the seat-back 22, the upper edge 32 will be extended over the seat-back 22, and the lower edge 34 will be slid under the seat-back 22 so that the lower edge will be joined to the upper edge area by way of a lap-joint, a butted joint, or other joint using a releasable and preferably adjustable connector, such as hook and loop material 38, buckles, straps, zippers, and the like. As illustrated, it is contemplated that the different sizes of seat-backs 22 may be accommodated by simply varying the size of the rectangular sheet 24 or by providing various connection mechanisms near the upper edge area and the lower edge area.

The FIGS. 1–4 also illustrate that it is contemplated that at least one, but preferably two shoulder-belts 40 will extend from the rectangular sheet 24 at a location 42 between the mid-section 36 and the upper edge 32 of the rectangular sheet 24. It also contemplated that the shoulder-belts 40 will include a first end 44 that extends from the location 42 on the upper surface of the rectangular sheet 24, and a second end 46. The second end 46 of the shoulder-belts 40 has been adapted for attachment to the lap-belt 14. This adaptation may include the provision of a loop 48 that accepts the lap-belt 14 therethrough, a buckle component that cooperates with the buckle area of the lap-belt 14 or a fastening mechanism that allows the shoulder belt 40 to extend from the rectangular sheet 24 to the lap-belt 14, attaching to the lap-belt 14. Thus, a person seated in the vehicle's seat 26 will be restrained in the seat by the rectangular sheet 24 that has been wound around the seat-back 22 and by the cooperation of the shoulder-belts 40 and the lap-belt 14.

Also illustrated in FIG. 1 is that the disclosed system 20 may also be used to reroute the chest strap 16 that is found in many OEM seatbelt systems. In the illustrated example, a loop 49 has been incorporated into the shoulder belts 40. The loop 49 may also be attached to the upper surface 28 of the rectangular sheet 24. The loop 49 simply engages the chest strap 16 and positions the chest strap 16 across the wearer's chest, starting from the trapezius area and extending across the torso. The loop 49 may be one of several loops found on the rectangular sheet 24 or along the shoulder belts 40. Additionally, the loops 49 may be of fixed dimension or adjustable size. The adjustability of the size may be accomplished by providing buckles or other mechanisms that allow adjustment of the size of the loops. Still further, it is contemplated that the rectangular sheet 24 the shoulder belts 40 and the chest strap 16 may include mating connectors that allow attachment of the chest strap 16 to the rectangular sheet 24 or at least one of the shoulder belts 40.

Turning now to FIGS. 5 and 6, it will be understood that it is also contemplated that the disclosed system 20 may include an adjustment mechanism for adjusting the overall length of the shoulder belts 40. In the illustrated examples, several straps 50 have been attached across the upper surface 28 of the rectangular sheet 24. These straps 50 anchor eyelets 52 that accept the shoulder belts 40 in order to adjust the overall free length of the shoulder belts 40. Thus, if a very small person were to use the system 20, the lowest eyelet 54 would be used to shorten the overall length of the shoulder belt 40. If a person with a longer torso were to use the system 20, then the highest eyelet 56 would be used to support the shoulder belt 40, and the lowest eyelet 54 would remain idle. Thus, the straps 50 and eyelets 54 provide an example of how to achieve a connection adjustment that allows the user to change of the location on the upper surface 28 of the rectangular sheet 24 where the first end 44 of the shoulder belts 40 extend from the upper surface 28 of the rectangular sheet 24.

Turning to FIG. 6, it will be understood that it is contemplated that the disclosed invention may accommodate several users at one time. A single, large rectangular sheet 24 is used to create a single device that restrains several passengers at one time. The Device incorporates several passenger stations 60, each defined by a set of belts or straps that accommodates a single passenger. Thus the three stations 60 shown in the example of FIG. 6 include eyelets 52 and shoulder belts 40, as found in the example shown in FIG. 5. Other features that have been illustrated in FIGS. 5 and 6 include an optional crotch strap 62, which may be formed from a pair of leg straps instead of a single strap as illustrated in FIGS. 5 and 6. The pair of leg straps would cooperate with lap-belt 14 in a manner similar to the cooperation of the shoulder belts 40 and the lap-belt 14. That is, attachment though loops at the ends of the straps, buckles, or other connectors that allow attachment through the belt buckle of the lap-belt 14 or attachment to the lap-belt 14 itself. Additionally, FIG. 5 illustrates the use of a seat cushion 71 with the system 20.

Additional features that may be incorporated onto the rectangular sheet 24 include a pair of sleeves 64 that include apertures 66 therethrough. The sleeves 64 extend from the rectangular sheet 24 at a location 68 between the mid-section 36 and the upper edge 32. The aperture 66 in the sleeves 64 accept the lap-belt 14, making wearing of the lap-belt 14 more comfortable. It is contemplated that the sleeves 66 will be padded to create a cushion 70 across the user's waist when the lap-belt 14 is extended through the sleeves 64 and fastened across the user's waist. It is contemplated that this cushion 70 may be large enough so as to act as a safety device that reduces the effects of a vehicle collision on the wearer.

Still further, it will be understood that the upper surface 30 of the disclosed rectangular sheet 24 can be used to support other devices or accessories, such as neck pillows that may be fastened to the rectangular sheet 24 in order to support the head and neck of the passenger in the system 20. The attachment may be by way of hook and loop material fastened to the upper surface 30 of the rectangular sheet 24 or other devices that allow attachment of such a pillow to the system 10.

FIG. 7 illustrates the use of straps 76 and buckles 78 to secure the system 20 to a vehicle seat. Additionally, the figure illustrates the use of a removable cushion 80 and crotch strap 82 to attach the cushion to the lower edge buckles 84. The crotch strap 82 functions as described above.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A flexible support system for seatbelts, the system cooperating with a lap-belt to restrain a person or child on a vehicle's seat, the vehicles' seat having a seat-back, the system comprising:

A flexible, generally rectangular sheet having an upper surface, a lower surface, an upper edge, a lower edge and a mid-section between the upper edge and the lower edge, the lower edge of the rectangular sheet being adapted for adjustable, selectively releasable connection to an area next to the upper edge of the rectangular sheet, so that the rectangular sheet is held against the seat-back by winding the rectangular section under the seat-back so that the lower edge connects with the section of the rectangular sheet between the mid-section of the rectangular sheet and the upper edge of the rectangular sheet;

At least one shoulder-belt extending from the rectangular sheet at a location between the mid-section of the rectangular sheet and the upper edge of the rectangular sheet, the shoulder-belt being adapted for attachment to the lap-belt, so that the shoulder belt will extend from the rectangular sheet to the lap-belt;

a pair of sleeves having an aperture therethrough, the sleeves extending from the rectangular sheet at a location between the mid-portion and the upper edge, the aperture in the sleeves being adapted for accepting the lap-belt, said sleeves being padded to create a cushion across the user's waist when the lap-belt is extended through the sleeves and fastened across the user's waist, and so that the person is held against the rectangular sheet by the shoulder-belt and the lap-belt.

2. A system according to claim 1 and further comprising at least one connection adjustment attached near the first end of the shoulder-belts, the connection adjustment allowing a change of the location on the upper surface of the rectangular sheet where the first end of the shoulder belt extend from the upper surface of the rectangular sheet.

3. A system according to claim 2 wherein the connection adjustment comprises at least one eyelet attached to the upper surface of the rectangular sheet, so that the location on the upper surface of the rectangular sheet where the first end of the shoulder belts extend from the upper surface of the rectangular sheet is changed by inserting or removing the shoulder-belt from the eyelet.

4. A flexible support system for seatbelts, the system cooperating with a lap-belt attached to a vehicle body, and serving to restrain a person or child on a vehicle seat that is mounted on the vehicle body, the vehicle seat having a seat-back, the system comprising:

A flexible, generally rectangular sheet having an upper surface, a lower surface, an upper edge, a lower edge and a mid-section between the upper edge and the lower edge, the lower edge of the rectangular sheet being adapted for adjustable, selectively releasable connection to an area next to the upper edge of the rectangular sheet, so that the rectangular sheet is held against the seat-back by winding the rectangular section under the seat-back so that the lower edge connects with the section of the rectangular sheet between the mid-section of the rectangular sheet and the upper edge of the rectangular sheet;

At least two shoulder-belt extending from the rectangular sheet at a location between the mid-section of the rectangular sheet and the upper edge of the rectangular sheet, the shoulder-belts having a first end that extends from a location on the upper surface of the rectangular sheet, and a second end, the second end of the shoulder-belts being adapted for attachment to the lap-belt, so that the shoulder belt will extend from the rectangular sheet to the lap-belt;

a pair of sleeves having an aperture therethrough, the sleeves extending from the rectangular sheet at a location between the mid-portion and the upper edge, the aperture in the sleeves being adapted or accepting the lap-belt, said sleeves being padded to create a cushion across the user's waist when the lap-belt is extended through the sleeves and fastened across the user's waist, and so that the person is held against the rectangular sheet by the shoulder-belt and the lap-belt.

5. A system according to claim 4 and further comprising at least one connection adjustment attached near the first end of the shoulder-belts, the connection adjustment allowing a change of the location on the upper surface of the rectangular sheet where the first end of the shoulder belts extend from the upper surface of the rectangular sheet.

6. A system according to claim 5 wherein the connection adjustment comprises at least one eyelet attached to the upper surface of the rectangular sheet, so that the location on the upper surface of the rectangular sheet where the first end of the shoulder belts extend from the upper surface of the rectangular sheet is changed by inserting or removing the shoulder-belt from the eyelet.

7. A method for restraining a person while seating in a vehicle seat, the seat having horizontal seating surface for the person and a seat-back, the method comprising:

providing a flexible support system for seatbelts, the system comprising:

A flexible, generally rectangular sheet having an upper surface, a lower surface, an upper edge, a lower edge and a mid-section between the upper edge and the lower edge, the lower edge of the rectangular sheet being adapted for adjustable, selectively releasable connection to an area next to the upper edge of the rectangular sheet, so that the rectangular sheet is held against the seat-back by winding the rectangular section under the seat-back so that the lower edge connects with the section of the rectangular sheet between the mid-section of the rectangular sheet and the upper edge of the rectangular sheet;

At least one shoulder-belt extending from the rectangular sheet at a location between the mid-section of the rectangular sheet and the upper edge of the rectangular sheet, the shoulder-belt being adapted for attachment to the lap-belt;

a pair of sleeves having an aperture therethrough, the sleeves extending from the rectangular sheet at a location between the mid-portion and the upper edge, the aperture in the sleeves being adapted for accepting the lap-belt, said sleeves being padded to create a cushion across the user's waist when the lap-belt is extended through the sleeves and fastened across the user's waist;

Extending the shoulder belt from the rectangular sheet over the person's torso and Attaching the shoulder belt to the lap-belt, and so that the person is held against the rectangular sheet by the shoulder-belt and the lap-belt.

8. A method according to claim 7 and further comprising providing at least one connection adjustment attached near the first end of the shoulder-belts, the connection adjustment allowing a change of the location on the upper surface of the rectangular sheet where the first end of the shoulder belts extend from the upper surface of the rectangular sheet.

9. A method according to claim 7 wherein the connection adjustment comprises at least one eyelet attached to the upper surface of the rectangular sheet, so that the location on the upper surface of the rectangular sheet where the first end of the shoulder belts extend from the upper surface of the rectangular sheet is changed by inserting or removing the shoulder-belt from the eyelet.

* * * * *